(12) United States Patent
Langgood et al.

(10) Patent No.: US 7,921,315 B2
(45) Date of Patent: Apr. 5, 2011

(54) MANAGING POWER CONSUMPTION IN A DATA CENTER BASED ON MONITORING CIRCUIT BREAKERS

(75) Inventors: John K. Langgood, Cary, NC (US);
Thomas F. Lewis, Raleigh, NC (US);
Kevin M. Reinberg, Chapel Hill, NC (US); Kevin S. D. Vernon, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 12/118,095

(22) Filed: May 9, 2008

(65) Prior Publication Data
US 2009/0282274 A1 Nov. 12, 2009

(51) Int. Cl.
*G06F 1/26* (2006.01)
(52) U.S. Cl. ......... 713/340; 361/652; 361/656; 713/300
(58) Field of Classification Search .................. 361/652, 361/656; 713/300, 340
See application file for complete search history.

(56) References Cited

U.S. PATENT DOCUMENTS

| | | | |
|---|---|---|---|
| 4,599,598 A | 7/1986 | Komoda et al. | |
| 4,788,527 A | 11/1988 | Johansson | |
| 5,614,811 A | 3/1997 | Sagalovich et al. | |
| 5,859,596 A | 1/1999 | McRae | |
| 6,281,784 B1 | 8/2001 | Redgate et al. | |
| 6,324,270 B1 | 11/2001 | Lund | |
| 6,717,510 B1 | 4/2004 | Loeuillet | |
| 7,268,294 B2 | 9/2007 | Ohkawa et al. | |
| 7,269,753 B2 * | 9/2007 | Farkas et al. ................... | 713/340 |
| 7,827,421 B2 * | 11/2010 | Brewer et al. .................. | 713/300 |

* cited by examiner

*Primary Examiner* — Albert Wang
(74) *Attorney, Agent, or Firm* — Brandon C. Kennedy; Cynthia G. Seal; Biggers & Ohanian, LLP.

(57) ABSTRACT

Managing power consumption in a data center including reporting, by a circuit breaker communications device of one of the circuit breakers to the management module, a current power load of the circuit breaker, the report transmitted from the circuit breaker communications device through a power supply communications device of a power supply currently providing power to a particular computing device and through an out-of-band communications link to the management module, upon receiving the report of the current power load, determining, by the management module, whether the current power load of the circuit breaker is greater than a predetermined threshold; and if the current power load of the circuit breaker is greater than the predetermined threshold, reducing, by the management module, power consumption through the circuit breaker of the particular computing device.

20 Claims, 2 Drawing Sheets

MANAGING POWER CONSUMPTION IN A DATA CENTER BASED ON MONITORING CIRCUIT BREAKERS

BACKGROUND OF THE INVENTION

1. Field of the Invention

The field of the invention is data processing, or, more specifically, methods, apparatus, and products for managing power consumption in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Different computer systems today often require different amounts of current to operate. Power supplies supplying such current are typically connected to a circuit breaker that protects the devices connected to the circuit breaker. Different circuit breakers have different current ratings. In data centers today, for example, a number of power supplies may be connected to a number of different circuit breakers, each having a different current rating. In such data centers when one of the circuit breakers is tripped, power and therefore operation of one or more computer systems may be affected. Decreasing the amount of time a computer system is affected by a tripped circuit breaker may increase efficiency of a data center, decrease costs of a customer, and provide a stable computing environment.

SUMMARY OF THE INVENTION

Methods, apparatus, and products for managing power consumption in a data center, the data center including one or more computing devices, each computing device connected to a plurality of power supplies, each power supply connected through a power line to one of a plurality of circuit breakers, each power supply including a power supply communications device, each circuit breaker including a circuit breaker communications device, the power supply communications devices and the circuit breaker communications devices capable of data communications through power lines, each power supply connected through an out-of-band communications link to a management module, the management module managing the computing devices, power supplies, and circuit breakers in the data center.

In embodiments of the present invention, managing power consumption in the a data center includes reporting, by a circuit breaker communications device of one of the circuit breakers to the management module, a current power load of the circuit breaker, the report transmitted from the circuit breaker communications device through a power supply communications device of a power supply currently providing power to a particular computing device and through an out-of-band communications link to the management module, upon receiving the report of the current power load, determining, by the management module, whether the current power load of the circuit breaker is greater than a predetermined threshold; and if the current power load of the circuit breaker is greater than the predetermined threshold, reducing, by the management module, power consumption through the circuit breaker of the particular computing device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
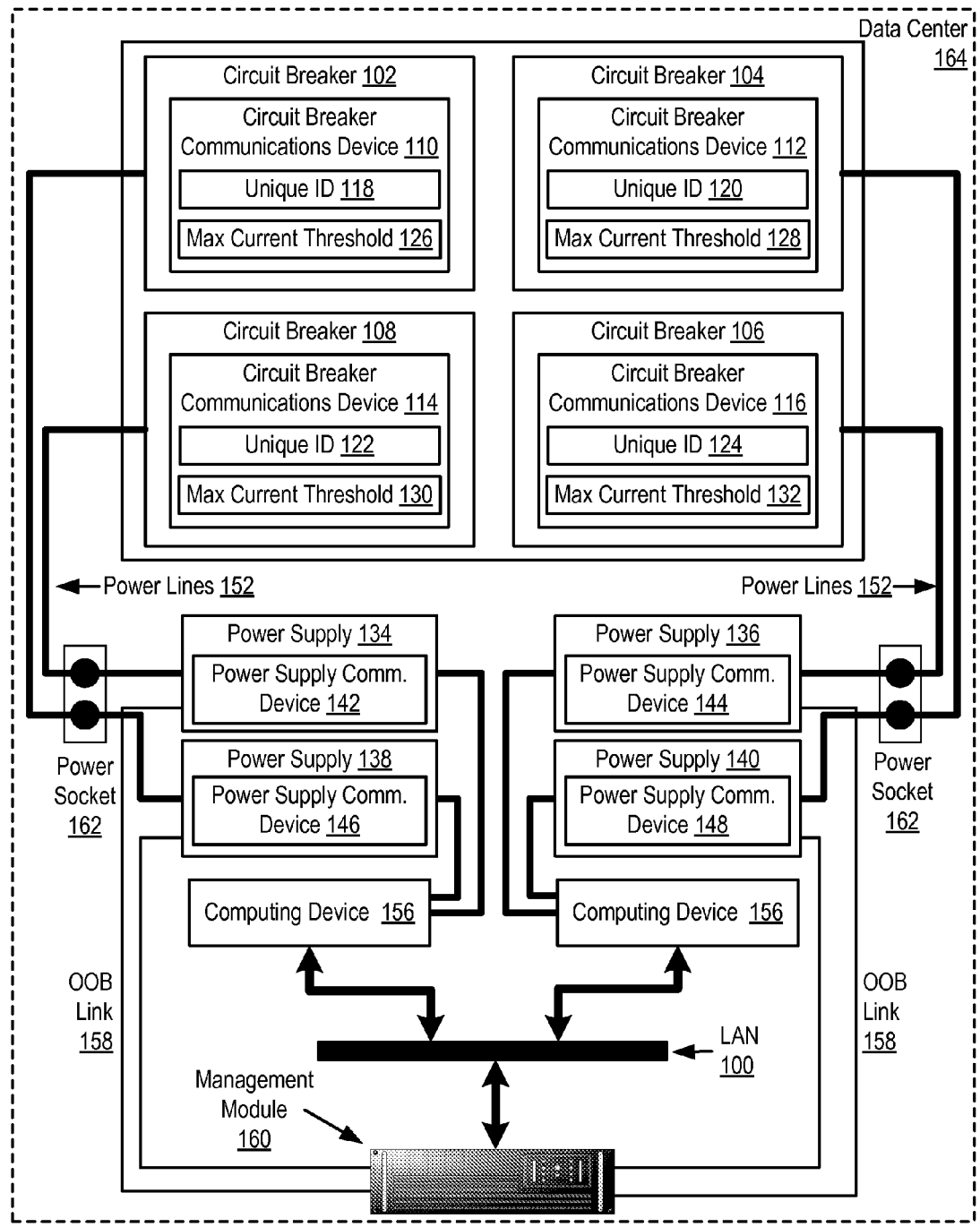
FIG. 1 sets forth a functional block diagram of an exemplary system for managing power consumption in a data center according to embodiments of the present invention.

Exemplary methods, apparatus, and products for managing power consumption in a data center in accordance with the present invention are described with reference to the accompanying drawings, beginning with FIG. 1. FIG. 1 sets forth a functional block diagram of an exemplary system for managing power consumption in a data center (164) according to embodiments of the present invention. The data center (164) is a facility that may be used to house mission critical computer systems and associated components. Such a data center may include environmental controls (air conditioning, fire suppression, etc.), redundant/backup power supplies, redundant data communications connections, and high security, highlighted by biometric access controls to compartmentalized security zones within the facility. A data center may also house a large amount of electronic equipment, typically computers and communications equipment. A data center is typically maintained by an organization for the purpose of handling the data necessary for the organization's operations. A bank, for example, may maintain a data center, where all its customers' account information is maintained and transactions involving these accounts are carried out. Practically every company that is mid-sized or larger has some kind of data center with the larger companies often having dozens of data centers.

The data center (164) in the example of FIG. 1 includes several computing devices (156) each powered by several power supplies (134,136,138,140). One computing device (156) in the example of FIG. 1 is connected to power supply (138) and power supply (134) while another computing device (156) is connected to power supply (136) and power supply (140). In accordance with embodiments of the present invention, one or more of the multiple power supplies connected to a computing device may provide to that computing device some or all power required for operation of the computing device. In some embodiments, for example, a computing device is connected to two power supplies with one power supply providing all required power and the other power supply providing no power, instead operating as a redundant power supply.

Computing devices useful in systems that administer power supplies in a data center in accordance with embodiments of the present invention may be implemented as any type of automated computing machinery such as, for example, blade servers. A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As a practical matter, all computers are implemented with electrical components requiring power that produce heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure.

The data center (164) of FIG. 1 also includes a management module (160). A management module is an aggregation of computer hardware and software that is installed in a data center to provide support services for computing devices, such as blade servers. Support services provided by the management module (164) include monitoring health of computing devices and reporting health statistics to a system management server, power management and power control, save and restore configurations, discovery of available computing devices, event log management, memory management, and so on. An example of a management module that can be used in systems for administering power supplies according to embodiments of the present invention is IBM's Advanced Management Module ('AMM').

The management module is connected for data communications to the computing devices through a local area network ('LAN') (100). The LAN may be implemented as an Ethernet, an IP (Internet Protocol) network, or the like. The management module is also connected to the power supplies through an out-of-band communications link. Such an out-of-band communications link may be implemented as an Inter-Integrated Circuit ('I²C') bus, a System Management Bus ('SMBus'), an Intelligent Platform Management Bus ('IPMB'), or the like.

As mentioned above the computing devices (156) in the example of FIG. 1 are powered by a number of power supplies (134,136,138,140). Each power supply in the example of FIG. 1 is connected through a power socket (162) and a power line (152) to one of several circuit breakers (102,104,106, 108). Each of the circuit breakers (102,104,106,108) in the example data center (164) of FIG. 1 is characterized by a circuit breaker identification (118,120,122,124) uniquely identifying the circuit breaker and a maximum current threshold (126,128,130,132). A circuit breaker is automatically-operated electrical switch designed to protect an electrical circuit from damage caused by overload or short circuit. Unlike a fuse, which operates once and then has to be replaced, a circuit breaker can be reset, either manually or automatically, to resume normal operation after being tripped.

Each circuit breaker (102,104,106,108) in the example of FIG. 1 also includes a circuit breaker communications device (110,112,114,116). Likewise, each power supply (134,136, 138,140) in the example of FIG. 1 includes a power supply communications device (142,144,146,148). A 'communications device' as the term is used in this specification is an aggregation of hardware and software that communicates with other devices via power lines. In this example the power supply communications devices and the circuit breaker communications devices are capable of communicating through the power lines (152). Power line communication ('PLC'), power line carrier, mains communication, power line telecom ('PLT'), and power line networking ('PLN'), are terms describing several different systems for using electric power lines to carry information over a power line. There are several competing standards for power line communication including the HomePlug Powerline Alliance, Universal Powerline Association, ETSI, and the IEEE. X10 is a de facto standard also used by RadioShack's Plug'n'Power system.

Communication devices useful in systems for managing power consumption in a data center may be implemented as INSTEON™ devices. Insteon is a home automation networking technology invented by SmartLabs, Inc., owner of Smarthome. Insteon is a robust, redundant dual-mesh network that combines wireless radio frequency (RF) with the existing electrical wiring, such as power lines. Insteon was originally developed for control and sensing applications in a home environment. Examples of typically applications of Insteon technologies include remote control lighting, HVAC, sprinklers, access control and so on. Insteon enables low-cost devices to be networked in a peer-to-peer network through the power line, radio frequencies ('RF'), or both. All Insteon devices in an Insteon network are peers, meaning that any device can transmit, receive, or repeat messages, without requiring a master controller or complex routing software. Adding more devices to an Insteon network makes an Insteon network more robust, by virtue of the Insteon protocol for communication retransmissions and retries.

A power domain map that describes electrical connections and electrical paths between circuit breakers and computing devices within the data center (164) may be established in the management module (160) through use of the communications devices in the example of FIG. 1. The management module (160) may use such a power domain map may in managing power consumption in the data center in accordance with embodiments of the present invention.

As part of establishing such a power domain map in the management module and upon connection of a first power supply through a power line to a circuit breaker in the data center, a power supply communications device of the first power supply queries, through the power line, a circuit breaker communications device of the circuit breaker for a circuit breaker identification. Such a circuit breaker identification uniquely identifies the circuit breaker. Assume for purposes of explanation only that the power supply (134) is the first power supply. As such, the first power supply communications device (142) will query, through the power line (152), the circuit breaker communications device (114) for the circuit breaker identification (122) upon connection of the power supply (134) to the circuit breaker (108). When the communications devices are implemented as Insteon devices the circuit breaker identification that uniquely identifies the circuit breaker may be the Insteon identification assigned to the circuit breaker communications device. All Insteon devices are assigned a permanent unique 24-bit address to assist in messaging between devices in an Insteon network. In this way, Insteon devices may be added to a network as a peer without the need for virtualized addresses, complex routing tables, or the like.

In the system of FIG. 1 establishing a power domain map may also include the power supply communications device (142) of the first power supply (134) querying the circuit breaker communications device (114) through the power line (152), for a maximum current threshold (130) for the circuit breaker (108). Different circuit breakers are designed with varying maximum current thresholds. A maximum current threshold, also called rated current, is the maximum current which the breaker is designed to carry continuously before being tripped. Although the communications device (142) of the first power supply (134) is described here as querying for only a single type of information, the maximum current threshold, readers of skill in the art will recognize that power supply communications device may query the circuit breaker communications devices for any other types of information such as, for example, a maximum voltage rating of the circuit breaker, the maximum power rating of the circuit breaker, and the like.

After receiving both the circuit breaker identification (122) and the maximum current threshold (130), the power supply communications device (142) in the system of FIG. 1 then sends the circuit breaker identification (122) and the maximum current threshold (130) for the circuit breaker (108) through the out-of-band communications link (158) to the management module (160). As the management module receives such circuit breaker identifications and maximum current thresholds from each pair of circuit breaker and power supply, the management module associates in a data structure, referred to here as a power domain map, an identification of the circuit breaker, an identification of the power supply, an identification of the computing device connected to the power supply, and the maximum current threshold for the circuit breaker. Such a power domain map may be implemented as a table, a linked list, an array or any other data structure capable of storing such associations as will occur to readers of skill in the art.

As mentioned above, power consumption in the data center (164) of FIG. 1 is managed in accordance with embodiments of the present invention. The system of FIG. 1 may operate generally for managing power consumption in the data center (164) by reporting, by a circuit breaker communications device (114) of one of the circuit breakers (108) to the management module (160), a current power load of the circuit breaker. A current power load is a value representing the amount of power currently being used by a power supply and a computing device through the circuit breaker. Such a current power load may be expressed as current, such as 500 milliamps, voltage, such as 120 VAC, or power, such as 350 Watts.

The report of current power load may be transmitted from the circuit breaker communications device (114) through a power supply communications device (142) of a power supply (134) currently providing power to a particular computing device (156) and through an out-of-band communications link (158) to the management module (160). Upon receiving by the management module (160) such a report of the current power load of a circuit breaker (108), the system of FIG. 1 may manage power consumption in the data center (164) by determining, by the management module (160), whether the current power load of the circuit breaker (108) is greater than a predetermined threshold. A predetermined threshold may be established, by a systems administrator, individually for each circuit breaker or as a global percentage to be applied to all circuit breaker's maximum current threshold. Consider, for example, that the maximum current threshold (130) of the circuit breaker (108) in the system of FIG. 1 is 2 amps. A system administrator may establish a predetermined threshold individually for that circuit breaker equivalent to 1 amp or, alternatively, establish a predetermined threshold that applies to all circuit breakers equivalent to 50 percent of the maximum current threshold of all the circuit breakers in the data center. If the current power load of the circuit breaker is greater than the predetermined threshold, the management module in the system of FIG. 1 may reduce power consumption through the circuit breaker of the particular computing device.

The arrangement of servers, power supplies, circuit breakers, and other devices making up the exemplary system illustrated in FIG. 1 are for explanation, not for limitation. Data centers useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
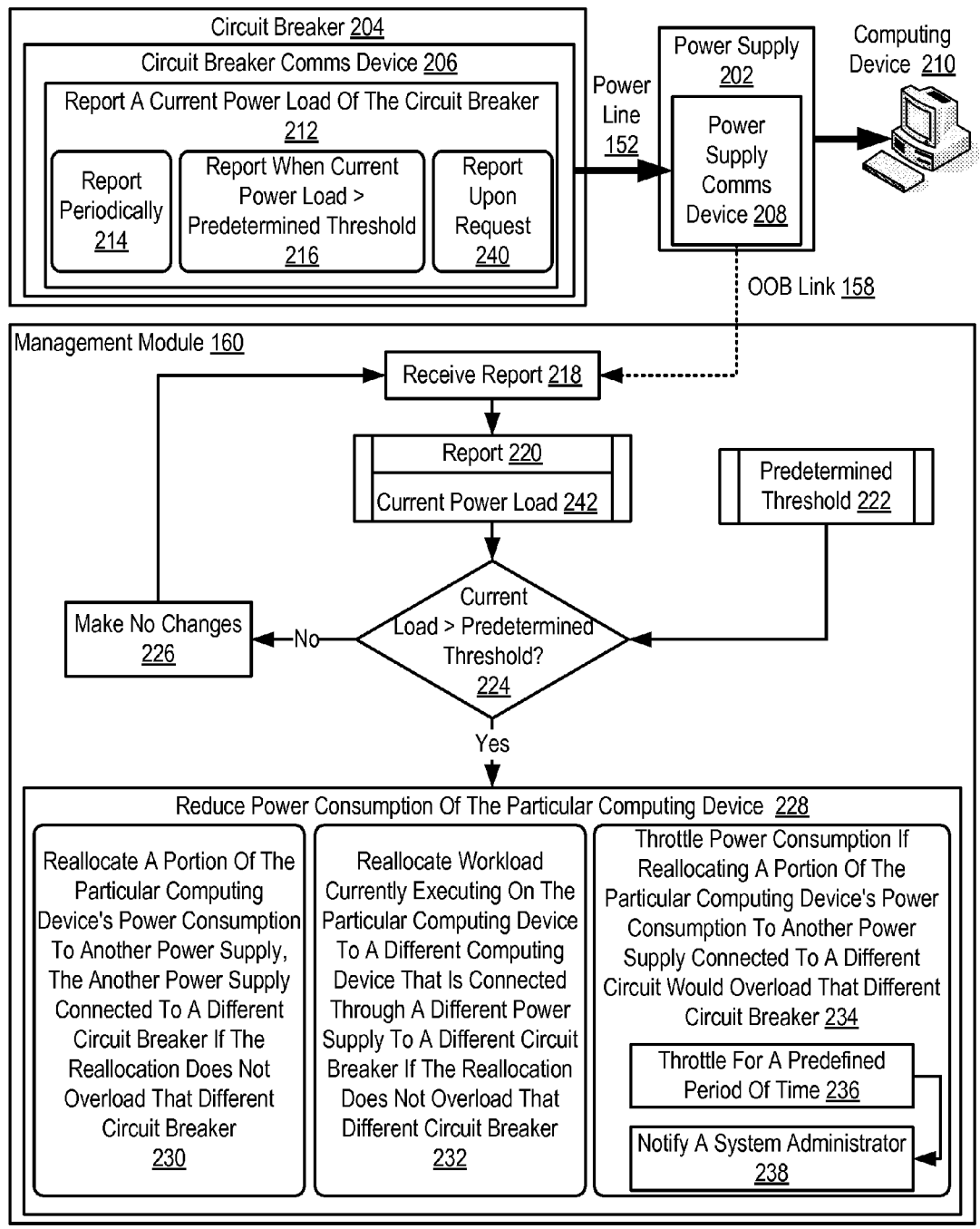
FIG. 2 sets forth a flow chart illustrating an exemplary method for managing power consumption in a data center according to embodiments of the present invention.

For further explanation, FIG. 2 sets forth a flow chart illustrating an exemplary method for managing power consumption in a data center according to embodiments of the present invention. The data center includes one or more computing devices where each computing device connected to more than one power supply. Each power supply is connected through a power line to one of a plurality of circuit breakers. Each power supply includes a power supply communications device. Each circuit breaker includes a circuit breaker communications device. The power supply communications devices and the circuit breaker communications devices are capable of data communications through power lines (152). Each power supply is connected through an out-of-band communications link to a management module. The management module in the example of FIG. 2 manages the computing devices, power supplies, and circuit breakers in the data center.

The method of FIG. 2 includes reporting (212), by a circuit breaker communications device (206) of one of the circuit breakers (204) to the management module (160), a current power load (242) of the circuit breaker (204). The report (220) may be transmitted from the circuit breaker communications device (206) through a power supply communications device (208) of a power supply (202) currently providing power to a particular computing device (210) and through an out-of-band communications link (158) to the management module (160).

In the method of FIG. 2 reporting (212) a current power load (242) of the circuit breaker may be carried out in various ways. Reporting (212) a current power load (242) of the circuit breaker, for example, may be carried out by reporting (214) the current power load (242) of the circuit breaker periodically at predefined intervals of time. Reporting (212) a current power load (242) of the circuit breaker may also be carried out by reporting (216) the current power load (242) of the circuit breaker when the current power load (242) of the circuit breaker is greater than a predetermined threshold (222). Reporting (212) a current power load (242) of the circuit breaker may also be carried out by reporting (240) the current power load (242) of the circuit breaker upon request from the management module (160).

Upon receiving (218) the report (220) of the current power load (242), the method of FIG. 2 continues by determining (224), by the management module (160), whether the current power load (242) of the circuit breaker (204) is greater than a predetermined threshold (222). As mentioned above the predetermined threshold may be a threshold set for the individual circuit breaker or a threshold to be applied globally to all circuit breakers in the data center, such as a percentage of a maximum current rating of each circuit breaker.

Determining (224), by the management module (160), whether the current power load (242) of the circuit breaker (204) is greater than a predetermined threshold (222) may be carried out by comparing the value of the predetermined threshold (222) to the value received as the current power load (242) if the predetermined threshold is an individual threshold for each circuit breaker. If, in the alternative, the predetermined threshold is a global percentage of maximum current threshold of all circuit breakers in the data center, determining (224) whether the current power load (242) is greater than a predetermined threshold (222) may be carried out by identifying the maximum current threshold of the circuit breaker from an established power domain map, calculating an individual threshold for the circuit breaker, and comparing the calculated threshold to the current power load (242) received in the report (220).

When reporting (212) a current power load (242) of the circuit breaker is carried out by reporting (216) the current power load (242) of the circuit breaker when that current power load (242) is greater than a predetermined threshold (222), determining (224), by the management module (160), whether the current power load (242) of the circuit breaker (204) is greater than a predetermined threshold (222) may be carried out by receiving (218) the report. That is, the report itself is a representation of a determination that the current power load (242) is in fact currently greater than the predetermined threshold (222).

If the current power load (242) of the circuit breaker (204) is not greater than the predetermined threshold (22), the method of FIG. 2 continues by making (226) no changes to the power consumption of the particular computing device (210). If the current power load (242) of the circuit breaker (204) is greater than the predetermined threshold (222), however, the method of FIG. 2 continues by reducing (228), by the management module (160), power consumption through the circuit breaker of the particular computing device.

Reducing (228) power consumption of the particular computing device (210) in the method of FIG. 2 may be carried out in various ways. In the method of FIG. 2, for example, reducing (228) power consumption of the particular computing device (210) may be carried out by reallocating (230) a portion of the particular computing device's (210) power consumption to another power supply where the other power supply is connected to a different circuit breaker if such reallocation does not overload that different circuit breaker. In the method of FIG. 2, reducing (228) power consumption of the particular computing device (210) may also be carried out by reallocating (232) workload currently executing on the particular computing device (210) to a different computing device that is connected through a different power supply to a different circuit breaker if such reallocation does not overload that different circuit breaker.

In the method of FIG. 2, reducing (228) power consumption of the particular computing device (210) may also be carried out by throttling (234) power consumption of the particular computing device if reallocating a portion of the particular computing device's power consumption to another power supply connected to a different circuit would overload that different circuit breaker. Throttling (234) power consumption may be carried out by reducing the rate of CPU clock cycles, rate of memory bus communications, or rate of data communications of the computing device (210).

In the method of FIG. 2, throttling (234) power consumption of a particular computing device (210) may also include throttling (236) power consumption of the particular computing device for a predefined period of time and notifying (238) a system administrator that the particular computing device is currently throttled. That is, a system administrator may be notified that the particular computing device is not operating a full capacity when the power consumption of that device does not fall below the predetermined threshold after a predefined period of time and power consumption of the particular computing device cannot be reallocated to another circuit breaker without tripping the breaker.

Exemplary embodiments of the present invention are described largely in the context of a fully functional computer system for managing power consumption in a data center. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing power consumption in a data center, the data center comprising one or more computing devices, each computing device connected to a plurality of power supplies, each power supply connected through a power line to one of a plurality of circuit breakers, each power supply comprising a power supply communications device, each circuit breaker comprising a circuit breaker communications device, the power supply communications devices and the circuit breaker communications devices capable of data communications through power lines, each power supply connected through an out-of-band communications link to a management module, the management module managing the computing devices, power supplies, and circuit breakers in the data center, the method comprising:

reporting, by a circuit breaker communications device of one of the circuit breakers to the management module, a current power load of the circuit breaker, the report transmitted from the circuit breaker communications device through a power supply communications device of a power supply currently providing power to a particular computing device and through an out-of-band communications link to the management module, upon receiving the report of the current power load, determining, by the management module, whether the current power load of the circuit breaker is greater than a predetermined threshold; and if the current power load of the circuit breaker is greater than the predetermined threshold, reducing, by the management module, power consumption through the circuit breaker of the particular computing device.

2. The method of claim 1 wherein reducing, by the management module, power consumption through the circuit breaker of the particular computing device further comprises:
reallocating a portion of the particular computing device's power consumption to another power supply, the another power supply connected to a different circuit breaker if the reallocation does not overload that different circuit breaker.

3. The method of claim 1 wherein reducing, by the management module, power consumption through the circuit breaker of the particular computing device further comprises:
reallocating workload currently executing on the particular computing device to a different computing device that is connected through a different power supply to a different circuit breaker if the reallocation does not overload that different circuit breaker.

4. The method of claim 1 wherein reducing, by the management module, power consumption through the circuit breaker of the particular computing device further comprises:
throttling power consumption of the particular computing device if reallocating a portion of the particular computing device's power consumption to another power supply connected to a different circuit would overload that different circuit breaker.

5. The method of 4 wherein throttling power consumption of the particular computing device further comprises:
throttling power consumption of the particular computing device for a predefined period of time; and
notifying a system administrator that the particular computing device is currently throttled.

6. The method of claim 1 wherein reporting, by a circuit breaker communications device of one of the circuit breakers to the management module, a current power load of the circuit breaker further comprises:
reporting the current power load of the circuit breaker periodically at predefined intervals of time.

7. The method of claim 1 wherein reporting, by a circuit breaker communications device of one of the circuit breakers to the management module, a current power load of the circuit breaker further comprises:

reporting the current power load of the circuit breaker when the current power load of the circuit breaker is greater than a predetermined threshold.

8. The method of claim 1 wherein reporting, by a circuit breaker communications device of one of the circuit breakers to the management module, a current power load of the circuit breaker further comprises:
reporting the current power load of the circuit breaker upon request from the management module.

9. An apparatus for managing power consumption in a data center, the data center comprising one or more computing devices, each computing device connected to a plurality of power supplies, each power supply connected through a power line to one of a plurality of circuit breakers, each power supply comprising a power supply communications device, each circuit breaker comprising a circuit breaker communications device, the power supply communications devices and the circuit breaker communications devices capable of data communications through power lines, each power supply connected through an out-of-band communications link to a management module, the management module managing the computing devices, power supplies, and circuit breakers in the data center, the apparatus comprising a computer processor, a computer memory operatively coupled to the computer processor, the computer memory having disposed within it computer program instructions capable of:

reporting, by a circuit breaker communications device of one of the circuit breakers to the management module, a current power load of the circuit breaker, the report transmitted from the circuit breaker communications device through a power supply communications device of a power supply currently providing power to a particular computing device and through an out-of-band communications link to the management module, upon receiving the report of the current power load, determining, by the management module, whether the current power load of the circuit breaker is greater than a predetermined threshold; and if the current power load of the circuit breaker is greater than the predetermined threshold, reducing, by the management module, power consumption through the circuit breaker of the particular computing device.

10. The apparatus of claim 9 wherein reducing, by the management module, power consumption through the circuit breaker of the particular computing device further comprises:
reallocating a portion of the particular computing device's power consumption to another power supply, the another power supply connected to a different circuit breaker if the reallocation does not overload that different circuit breaker.

11. The apparatus of claim 9 wherein reducing, by the management module, power consumption through the circuit breaker of the particular computing device further comprises:
reallocating workload currently executing on the particular computing device to a different computing device that is connected through a different power supply to a different circuit breaker if the reallocation does not overload that different circuit breaker.

12. The apparatus of claim 9 wherein reducing, by the management module, power consumption through the circuit breaker of the particular computing device further comprises:
throttling power consumption of the particular computing device if reallocating a portion of the particular computing device's power consumption to another power supply connected to a different circuit would overload that different circuit breaker.

13. The apparatus of claim 9 wherein reporting, by a circuit breaker communications device of one of the circuit breakers to the management module, a current power load of the circuit breaker further comprises:
reporting the current power load of the circuit breaker periodically at predefined intervals of time.

14. The apparatus of claim 9 wherein reporting, by a circuit breaker communications device of one of the circuit breakers to the management module, a current power load of the circuit breaker further comprises:
reporting the current power load of the circuit breaker when the current power load of the circuit breaker is greater than a predetermined threshold.

15. A computer program product for managing power consumption in a data center, the data center comprising one or more computing devices, each computing device connected to a plurality of power supplies, each power supply connected through a power line to one of a plurality of circuit breakers, each power supply comprising a power supply communications device, each circuit breaker comprising a circuit breaker communications device, the power supply communications devices and the circuit breaker communications devices capable of data communications through power lines, each power supply connected through an out-of-band communications link to a management module, the management module managing the computing devices, power supplies, and circuit breakers in the data center, the computer program product disposed in a computer readable medium, the computer program product comprising computer program instructions capable of:
reporting, by a circuit breaker communications device of one of the circuit breakers to the management module, a current power load of the circuit breaker, the report transmitted from the circuit breaker communications device through a power supply communications device of a power supply currently providing power to a particular computing device and through an out-of-band communications link to the management module,
upon receiving the report of the current power load, determining, by the management module, whether the current power load of the circuit breaker is greater than a predetermined threshold; and
if the current power load of the circuit breaker is greater than the predetermined threshold, reducing, by the management module, power consumption through the circuit breaker of the particular computing device.

16. The computer program product of claim 15 wherein reducing, by the management module, power consumption through the circuit breaker of the particular computing device further comprises:
reallocating a portion of the particular computing device's power consumption to another power supply, the another power supply connected to a different circuit breaker if the reallocation does not overload that different circuit breaker.

17. The computer program product of claim 15 wherein reducing, by the management module, power consumption through the circuit breaker of the particular computing device further comprises:
reallocating workload currently executing on the particular computing device to a different computing device that is connected through a different power supply to a different circuit breaker if the reallocation does not overload that different circuit breaker.

18. The computer program product of claim 15 wherein reducing, by the management module, power consumption through the circuit breaker of the particular computing device further comprises:
throttling power consumption of the particular computing device if reallocating a portion of the particular computing device's power consumption to another power supply connected to a different circuit would overload that different circuit breaker.

19. The computer program product of claim 15 wherein reporting, by a circuit breaker communications device of one of the circuit breakers to the management module, a current power load of the circuit breaker further comprises:
reporting the current power load of the circuit breaker periodically at predefined intervals of time.

20. The computer program product of claim 15 wherein reporting, by a circuit breaker communications device of one of the circuit breakers to the management module, a current power load of the circuit breaker further comprises:
reporting the current power load of the circuit breaker when the current power load of the circuit breaker is greater than a predetermined threshold.

* * * * *